UNITED STATES PATENT OFFICE.

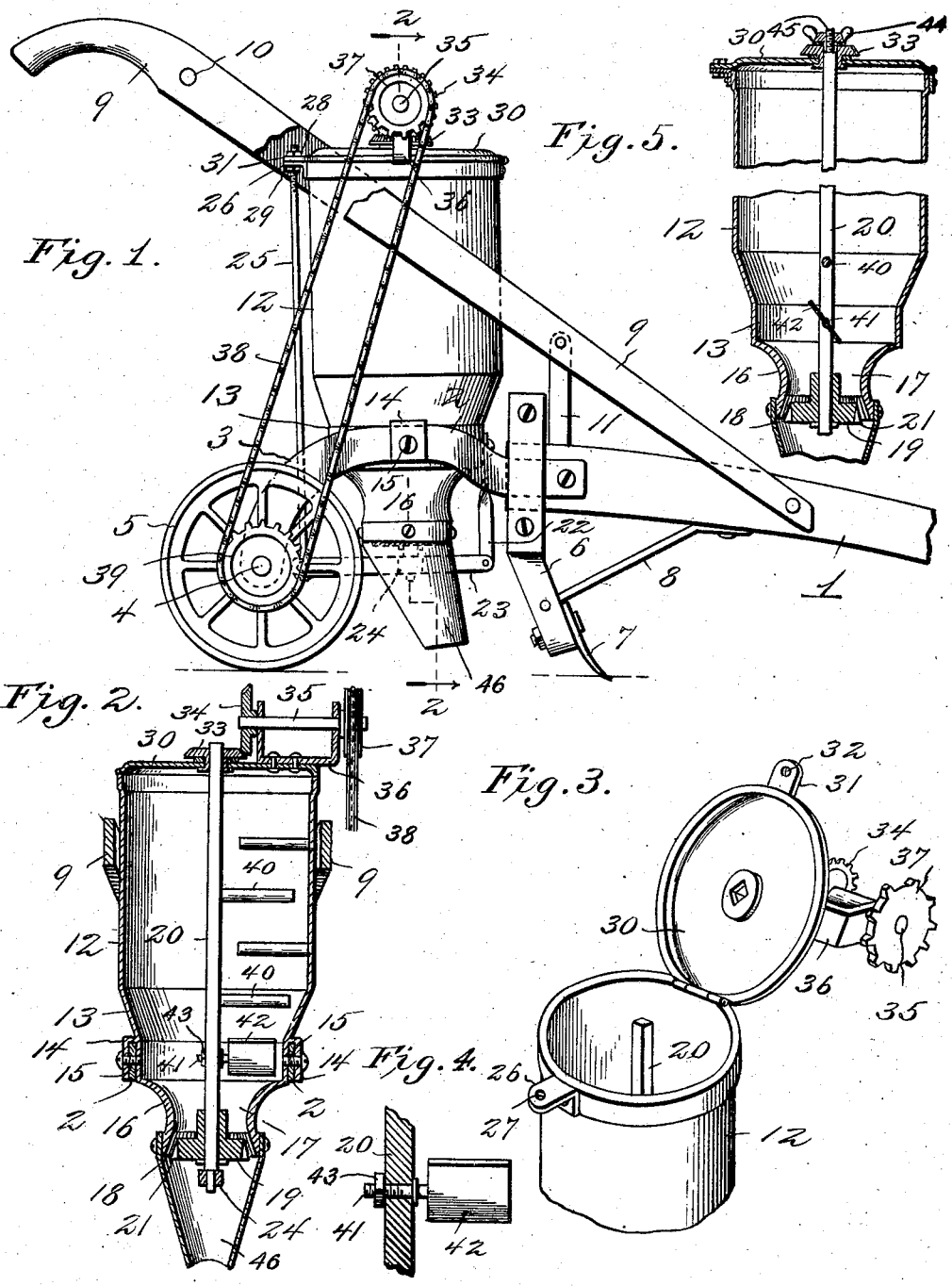

NEWTON FLEMMING HANCOCK, OF FAYETTEVILLE, TENNESSEE.

FERTILIZER-DISTRIBUTER.

No. 853,692.  Specification of Letters Patent.  Patented May 14, 1907.

Application filed October 1, 1904. Renewed October 25, 1906. Serial No. 340,602.

*To all whom it may concern:*

Be it known that I, NEWTON FLEMMING HANCOCK, a citizen of the United States, residing at Fayetteville, in the county of Lincoln and State of Tennessee, have invented a new and useful Fertilizer-Distributer, of which the following is a specification.

This invention relates to fertilizer distributers and it has for its object to provide a device of this class which shall possess superior advantages in point of simplicity, durability and general efficiency.

Another object is to provide a fertilizer distributer which shall be in the nature of an attachment to a plow or other similar earth-engaging implement which shall serve to open a furrow in which the fertilizing material may be deposited.

Another object of the invention is to provide a device of the class referred to in which the fertilizing material shall be subjected to a grinding action, whereby lumps, caused therein by dampness, shall be ground or crushed previous to being deposited.

With these and other ends in view which will readily appear as the nature of the invention is better understood, the same consists in the improved construction and novel combination and arrangement of parts which will be hereinafter fully described and particularly pointed out in the appended claims.

In the accompanying drawings has been illustrated a simple and preferred form of embodiment of the invention; it being understood, however, that I do not necessarily limit myself to the precise structural details therein exhibited, but that such changes and modifications may be made as come fairly within the scope of the invention and which may be resorted to without departing from the spirit or sacrificing any of the advantages of the same.

In said drawings: Figure 1 is a side elevation showing my improved fertilizer distributer attached in operative position to the beam of an ordinary plow. Fig. 2 is a transverse vertical sectional view taken on the line 2—2 in Fig. 1. Fig. 3 is a perspective detail view showing the upper part of the hopper with the lid carrying a portion of the operating mechanism thrown open. Fig. 4 is a sectional detail view on an enlarged scale, of a portion of the rotary shaft carrying the adjustable paddle; and Fig. 5 is a sectional detail view illustrating a modification.

Corresponding parts in the several figures are indicated by similar numerals of reference.

Under the preferred construction of my invention, the rear end of the plow beam 1 which supports my improved fertilizing attachment, is provided with rearwardly extending, outwardly bulging brackets 2, the rear ends of which are extended downwardly, forming hangers 3 which afford bearings for a shaft or axle 4 upon which the transporting wheels 5 are mounted. The plow beam is preferably provided with an adjustable standard 6 carrying a plow or earth-engaging implement 7 and held securely by means of a brace 8. Handles 9 are secured to the sides of the plow beam and extend upwardly and rearwardly from the latter, said handles being connected with each other by a rung 10 and with the plow beam by means of a brace 11.

12 designates a hopper which includes a cast iron bottom portion 13 which is provided with exteriorly disposed lugs 14 whereby it may be supported upon and mounted between the bulging brackets 2, stud-bolts or other suitable means, 15, being provided for the purpose of securely connecting the parts; said hopper also includes a cylindrical container 16, preferably made of sheet metal and suitably connected with the bottom portion 13. The latter is provided with a vertical bore or opening 17, the lower end of which is somewhat expanded, as shown at 18, to form a housing for a grinding member 19 supported upon the lower end of a shaft 20 which extends vertically through the hopper. The grinding member 19 and its housing 18 are provided with reversely disposed serrations indicated at 21, which coact with each other to reduce any lumps that may be found in the fertilizing material to a powder.

In Figs. 1 and 2 of the drawings, a link 22 has been shown depending from the front side of the hopper, the lower end of said link being connected pivotally with a cross-bar 23 having a step or support 24 for the reception of the lower end of the vertical shaft 20; the rear end of the cross-bar 23 is connected by a link 25 with a lug 26 extending from the rear side of the hopper, said lug being provided with a perforation 27 through which the upper screw-threaded end of the link-rod 25 extends, said link-rod being provided with nuts 28 and 29 above and below the lug 26 so as to provide for the vertical adjustment of the said link-rod and incidentally of the shaft 20 carrying the grinding member 18 which may thus be adjusted at any desired distance from the walls of the housing 18, thereby regulating the degree of fineness to which the fertilizing material shall be pulverized. The cylindrical member of the hopper 12 is provided with a hinged lid 30 hinged at the front edge thereof and provided with a lug 31 having a perforation 32 adapted to engage the upper end of the link-rod 25 and to be secured by means of the nut 28. This lid is preferably perforated for the passage of the upper end of the shaft 20 which is non-circular in shape and upon which is mounted a bevel pinion 33 meshing with a bevel pinion 34 mounted upon a shaft 35 which is journaled in suitable brackets 36 rising from the lid 30. The outer end of said shaft carries a sprocket wheel 37 connected by a chain 38 with a sprocket wheel 39 upon the axle 4 of the machine from which, when the machine is in operation, motion will be transmitted to the shaft 35, and through the latter and the bevel gearing 33, 34, to the vertical shaft 20. The latter is provided with a plurality of radially extending stirring or agitating arms 40, and it has near its lower end a short horizontal stem 41 carrying an obliquely disposed paddle 42; the stem 41 is preferably screw-threaded and extends through a transverse threaded opening in the shaft 20 in which it is secured at any desired adjustment by means of a locknut 43; by this arrangement, it will be observed that the paddle 42 may be secured at any desired degree of obliquity; it is to be understood, however, that, within the scope of the invention, any other suitable and approved means may be resorted to in order to effect the same result.

In Fig. 5 of the drawings has been illustrated a modification of the invention under which the shaft 20 carrying the rotary grinding member 19, in place of being stepped in a cross-bar 24 disposed underneath the hopper, is held in place by means of a thumb-nut 44 adjusted upon the upper end of said shaft which, for this purpose, is reduced and screw-threaded, as shown at 45. It will be remembered that the upper end of the shaft 20 extends through the lid 30 and that it carries, above said lid, the bevel gear 33; in practice, the thumb-nut 44 will be adjusted upon the shaft 20 above said bevel gear which rests upon the lid, so that, by the adjustment of said nut, the vertical adjustment of the shaft 20 and the grinding member 19 may be effected.

I desire it to be understood that, whenever desired, an earth-engaging wheel may be disposed in front of the plow standard and that the power for rotating the shaft 20 and its related parts may be derived from such ground-engaging wheel; this and other modifications of a like nature are clearly within the scope of the invention and may be resorted to whenever desired.

From the foregoing description taken in connection with the drawings hereto annexed, the operation and advantages of my improved fertilizer distributer will be readily understood.

When the machine progresses over the field, the earth-engaging element 7 will open a furrow in front of the discharge spout of the hopper which has been designated 46 and which is suitably connected with the lower end of the hopper. From the ground-engaging wheels a rotary motion is transmitted to the shaft 20, the arms 40 of which will stir and agitate the contents of the hopper which, by the inclined paddle 42, will be forced downwardly and caused to pass between the grinding member 19 and the housing 18 whereby it is thoroughly pulverized previous to being deposited in the furrow. The obliquely disposed paddles 42 may be disposed at any angle which shall enable it to efficiently feed or force the contents of the hopper in a downward direction, as will be readily understood. By the adjusting means provided for that purpose, the shaft 20 with its related parts may be raised or lowered, thereby regulating the flow or quantity of fertilizing material to be distributed.

This device, as will be seen, is simple, easily operated, and thoroughly feasible and practical for the purposes for which it is intended.

Having thus described the invention, what is claimed is:

1. In a device of the class described, the combination with a plow beam having rearwardly extending, bulging arms, of a hopper casing mounted between said arms, said hopper casing being provided at its lower end with a vertical bore terminating in a housing, serrated upon its inner side, a vertically adjustable shaft within the hopper, and a grinding member upon said shaft having serrations disposed reversely to those upon the housing.

2. In a device of the class described, a plow beam having rearwardly extending, bulging brackets, a hopper casing having lugs engaging said brackets and provided with an interiorly serrated housing, a vertically adjustable shaft within the hopper casing carrying a grinding member within the housing, radially extending agitators upon said shaft, and a paddle adjustably connected with said shaft and adapted to be secured at various degrees of obliquity.

3. A plow beam having rearwardly extending, bulging arms or brackets, a hopper casing including a lower cast metal portion having lugs engaging said brackets and bored vertically to form a passage terminating in an expanded, interiorly serrated housing at its lower end and an upwardly extending cylindrical casing, a lid hinged to the forward end of said casing and forming a bearing for the upper end of a shaft carrying a rotary grinding member at its lower end, a driven shaft supported upon said lid, and bevel gearing for transmitting motion from said driven shaft to the shaft carrying the grinding member.

4. A plow beam having rearwardly extending, bulging brackets terminating in downwardly extending hangers, an axle journaled in said hangers, ground-engaging wheels upon said axle, a hopper having lugs supported between and upon the bulging brackets, a housing at the lower end of the hopper forming a grinder casing, a shaft extending vertically through the hopper and carrying a grinding member within said casing, a lid connected hingedly with the upper end of the hopper and having a bearing for the upper end of the vertical shaft, a driven shaft supported upon the lid, means for transmitting motion from said driven shaft to the vertical shaft, means for effecting vertical adjustment of the latter, and means for securing the lid in a closed position.

In testimony that I claim the foregoing as my own, I have hereto affixed my signature in the presence of two witnesses.

NEWTON FLEMMING HANCOCK.

Witnesses:
 FRED C. DICKEY,
 C. M. BUCHANAN.